United States Patent [19]
Yamagishi et al.

[11] Patent Number: 6,119,553
[45] Date of Patent: Sep. 19, 2000

[54] ROTATION TRANSMITTING DEVICE

[75] Inventors: Toshimi Yamagishi; Yukio Sawada, both of Nagano-ken; Yoshio Yamaguchi, Chiba-ken, all of Japan

[73] Assignee: Harmonic Drive Systems, Inc., Tokyo, Japan

[21] Appl. No.: 09/203,578

[22] Filed: Dec. 2, 1998

[30] Foreign Application Priority Data

Dec. 2, 1997 [JP] Japan .................................. 9-331340

[51] Int. Cl.[7] .............................. F16H 37/04; F16C 33/82
[52] U.S. Cl. .......................... 74/640; 384/478; 384/133; 277/410
[58] Field of Search ............................. 74/640; 384/478, 384/133; 277/410

[56] References Cited

U.S. PATENT DOCUMENTS

| | | | |
|---|---|---|---|
| 3,196,713 | 7/1965 | Robinson | 74/640 |
| 3,214,999 | 11/1965 | Lapp | 74/640 |
| 3,620,584 | 11/1971 | Rosensweig | 277/410 |
| 4,526,380 | 7/1985 | Raj et al. | 277/410 |
| 4,842,426 | 6/1989 | Furumura et al. | 384/478 |
| 4,898,480 | 2/1990 | Raj et al. | 384/478 |
| 5,642,645 | 7/1997 | Foley et al. | 74/640 |

FOREIGN PATENT DOCUMENTS

| | | |
|---|---|---|
| 46-32883 | 9/1971 | Japan . |
| 1-116798 | 8/1989 | Japan . |
| 1-116799 | 8/1989 | Japan . |
| 7-56322 | 6/1995 | Japan . |
| 2669680 | 7/1997 | Japan . |

*Primary Examiner*—Sherry Estremsky
*Attorney, Agent, or Firm*—Burns, Doane, Swecker & Mathis, L.L.P.

[57] ABSTRACT

A rotation transmitting device 1 introduces rotation into a vacuum side space 200 via a flexible meshing type gear drive 4 from an atmosphere side space 100. A first spacer 15 is disposed between ball bearings 13 and 14 of a rotation output shaft 5 positioned at the vacuum side, and a magnetic circuit is formed passing from the spacer 15 and through the ball bearing 13, a shaft portion 51 of the rotation output shaft 5 and the ball bearing 14. A magnetic fluid is filled as lubricant for lubricating potions of the ball bearings 13 and 14, which is retained on these portions by magnetic force generated by the magnetic circuit, whereby these portions are always lubricated appropriately. The magnetic fluid retained on these portions captures wear particles or other dust generated from the ball bearings 13 and 14, preventing these particles from leaking out to the vacuum side.

9 Claims, 4 Drawing Sheets

ROTATION TRANSMITTING DEVICE

BACKGROUND OF THE INVENTION

1. Technical Field

This invention relates to a rotation transmitting device for transmitting a drive force such as a rotational force between different working environments which are airtightly divided by a partition wall.

2. Description of the Prior Art

In the field of semiconductor manufacturing equipment, for example, a vacuum pump is used to maintain a reaction chamber a high vacuum condition, in which wafers are disposed and reaction gasses are introduced to form thin films on the wafers by means of CVD or other method. Work transfer in the reaction chamber must be carried out while maintaining an airtight condition, and a transfer mechanism therefor must be constituted so that an arm portion for gripping works in the reaction chamber is partitioned in a perfectly airtight condition from a drive mechanism for transmitting a drive force to the arm portion from the outside of the reaction chamber. Further, dust or the like must be prevented from generating as much as possible at the side of the reaction chamber. Therefore, it is preferable that the drive mechanism for driving the arm portion in the reaction chamber does not generate wear particles, lubricant mist or the like.

In the past, as a mechanism for transmitting a drive force from one to the other side between different working areas which are perfectly partitioned with each other, there have known one that has magnet couplings, one that has bellows, and one that has magnetic seals. On the other hand, the assignee of this patent application proposed a rotation transmitting device that utilizes a flexible meshing type gear drive in Japanese Utility Model Laid-Open No. Hei 1-116798.

The rotation transmitting device utilizing the flexible meshing gear drive is capable of transmitting a rotational force of high torque between partitioned working areas with high rotational accuracy.

An object of this invention is, in a rotation transmitting device utilizing a flexible meshing type gear drive, to realize lubrication to portions of the rotational transmitting device that must be lubricated appropriately for a prolonged period of time, whereby realizing prolongation of the life of the rotation transmitting device.

Further, another object of this invention is to provide a mechanism for suppressing generation of wear particles and other dust in a rotation transmitting device utilizing a flexible meshing type gear drive.

SUMMARY OF THE INVENTION

In order to achieve the above and other objects, according to this invention, there is provided a rotation transmitting device which has a rotation input shaft disposed in a first space, a rotation output shaft disposed in a second space, a flexible meshing type gear drive for transmitting a rotational motion introduced via the rotation input shaft into a side of the rotation output shaft, wherein the flexible meshing type gear drive has a circular rigid internal gear, a flexible external gear and a wave generator for flexing the flexible external gear radially to mesh it partially with the rigid internal gear and for shifting meshing portions circumferentially, and wherein the wave generator is connected with the rotation input shaft, the rigid internal gear is connected with the rotation output shaft, and the flexible external gear is used as a partition wall for airtightly partitioning the first and second spaces: comprising a bearing mechanism for rotatably supporting the rotation output shaft, a magnetic fluid as lubricant for lubricating portions to be lubricated in the bearing mechanism, and a magnetic circuit for generating a magnetic force to retain the magnetic fluid on the portions to be lubricated.

The bearing mechanism is typically constituted so that it comprises first and second roller bearings rotatably supporting the rotation output shaft, and a first spacer which is inserted between outer races of the first and second roller bearings to maintain the gap between the bearings to be constant. In this case, the first spacer is constituted to have a magnet member magnetized along an axial line direction of the rotation transmitting device, a first spacer piece inserted between the magnet member and the outer race of the first roller bearing, and a second spacer piece inserted between the magnet member and the outer race of the second roller bearing. In addition, the first and second roller bearings, and at least a portion of the rotation output shaft supported by the first and second roller bearings are made of magnetic material. As a result, the magnetic circuit is formed along a route starting from the first spacer piece, passing through the rotation output shaft and the second roller bearing, and returning to the first spacer piece.

The first spacer may be a single member having the magnet member, and the first and second spacer pieces formed integrally.

Typically, the bearing mechanism is also provided with a second spacer inserted between inner races of the first and second roller bearings. In this case, the second spacer may be made of magnetic material, while the rotation output shaft nonmagnetic material. As a result, the magnetic circuit is formed along a route staring from the first spacer, passing through the first roller bearing, the second spacer and the second roller bearing, and returning to the first spacer.

In the rotation transmitting device as constituted above, the portions to be lubricated in the bearing mechanism, for example, rolling contact portions between the rolling parts and the races are lubricated with the magnetic fluid. The magnetic fluid as lubricant is retained on the portions to be lubricated by means of the magnetic circuit, and is not expelled from the rolling contact portions even by the rolling motion of the bearing mechanism, thus effective lubrication of the portions to be lubricated can be assured. As a result, in comparison with the conventional case where vacuum grease, solid lubricant and the like are used as lubricant, a sufficient lubrication can be assured for a prolonged period of time, whereby realizing a prolonged life of the rotation transmitting device.

Further, since the magnetic fluid is retained on the portions to be lubricated by the magnetic circuit, wear particles and other dust which may generate from the portions to be lubricated are captured by the magnetic fluid retained thereon, whereby an effect can be obtained that the dust do not scatter or leak out toward other portions.

In order further to improve lubricating action to the portions to be lubricated in the rotation transmitting device of this invention, it is desirable to form a solid lubricant film on a surface of the portions to be lubricated in the bearing mechanism.

On the other hand, the rotation transmitting device of this invention comprises, in addition to the above constitution or apart therefrom, a magnetic lubricant as lubricant for lubricating meshing portions between the rigid internal gear and the flexible external gear, and a second magnetic circuit for generating a magnetic force to retain on the magnetic fluid on the meshing portions. In this case also, lubrication of the meshing portions between the rigid internal gear and the flexible external gear is maintained appropriately for a long time. As a result, prolongation of life of the rotation transmitting device can be realized.

In this case, at least one of the rigid internal gear, the flexible external gear, and an outer race of a bearing of the wave generator is magnetized along the axial line direction of the rotation transmitting device, so that the second magnetic circuit is formed through the magnetized part.

Where a solid lubricant film is formed on an internal-tooth surface of the rigid internal gear and on an external-teeth surface of the flexible external gear, lubricity of the meshing portions between the gears can be further enhanced and at the same time dust generation from the meshing portions can be further suppressed.

DETAILED DESCRIPTION OF THE PREFERRED EMBODIMENT

With reference to the drawings, a rotation transmitting device according to this invention will now be explained.
(Overall structure)

Figure 1:
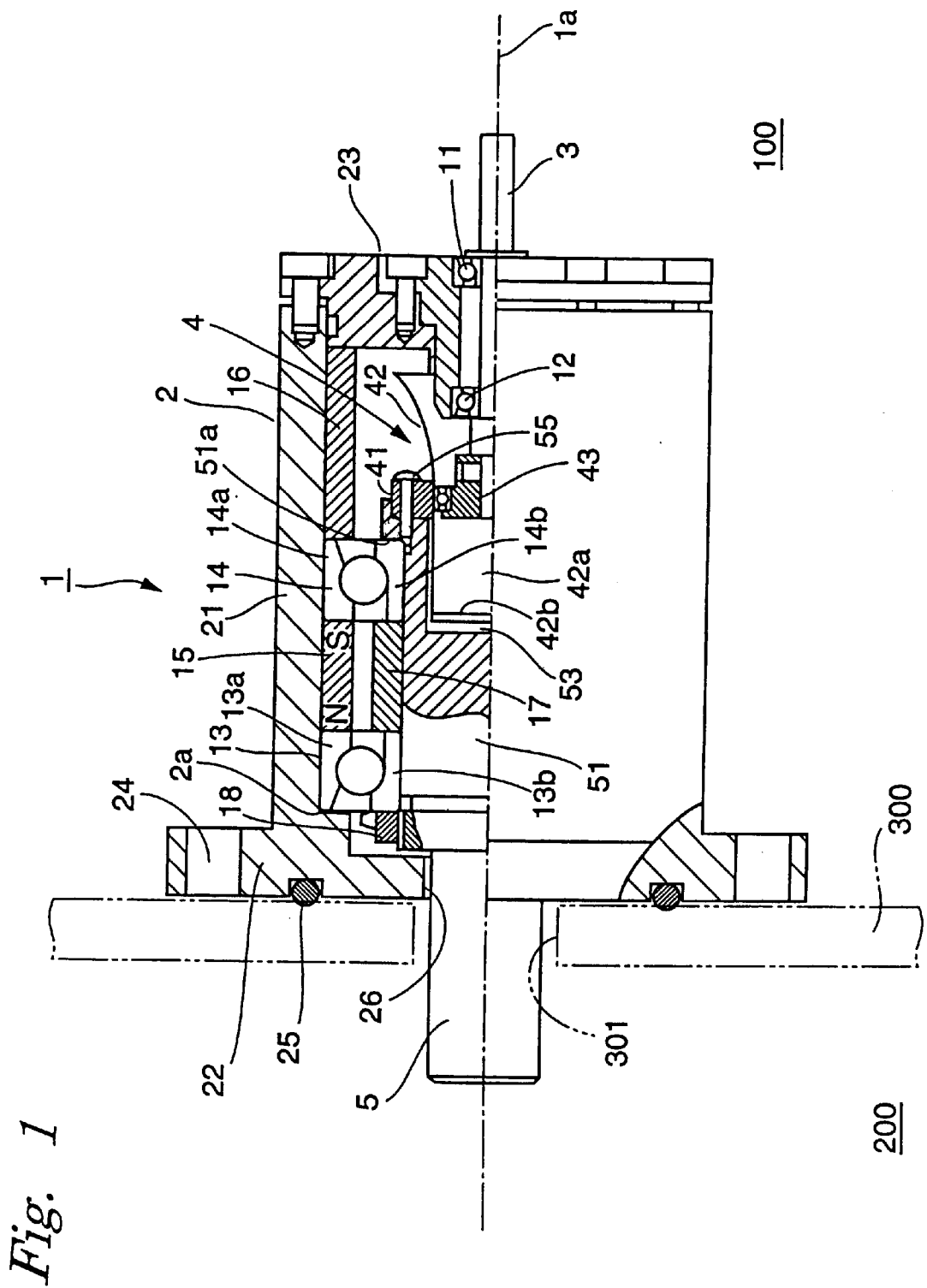
FIG. 1 is a schematic diagram showing a rotation transmitting device of this invention in a half section.

FIG. 1 illustrates a rotation transmitting device in a half sectional state. The shown rotation transmitting device 1 is mounted on a partition wall 300 which airtightly partitions a first space 100 at the atmosphere side and a second space 200 at the vacuum side, and reduces speed of rotation from a drive source (not shown) disposed at the side of the first space 100 and introduces the rotation of reduced speed into the side of the second space 200.

The rotation transmitting device 1 has a hollow casing 2, a rotation input shaft 3 disposed inside the casing 2 coaxially about an axial line 1a of the rotation transmitting device, a flexible meshing type gear drive 4, and an rotation output shaft 5. The rotation input shaft 3 is connected to a wave generator 43 of the flexible meshing type gear drive 4, while the rotation output shaft 5 is connected to a rigid internal gear 41 thereof. The casing 2 has an annular body 21, a wide flange 22 closing an front end of the body 21, and a bottom wall 23 closing the other end of the body21. The flange 22 is integrally formed on the body 21 whose outer circumferential side portion is formed with a plurality of bolt holes 24 along a circumferential direction at an equal angular distance, and an O-ring 25 is mounted inner side of the bolt holes 24.

The flange 22 is fixed on the partition wall 300 with fastening bolts (not shown) inserted into the bolt holes 24, whereby the rotation transmitting device 1 is mounted on the partition wall 300. In a mounted condition, the rotation output shaft 5 rotatably passes through axial holes 301 and 26 formed in the partition wall 300 and the flange 22, respectively, and its end side portion projects into the second space 200. At the same time, flange 22 and the partition wall 300 are air-tightly sealed by the O-ring 25.

Figure 2C:
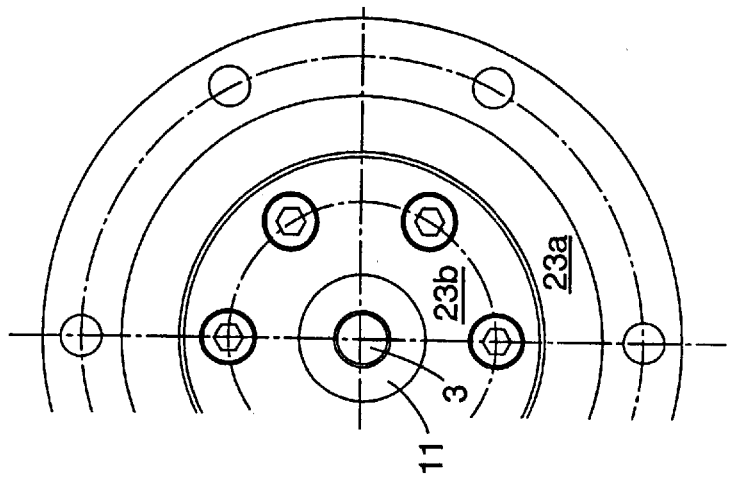
FIGS. 2A, 2B and 2C show a flexible meshing type gear drive, a rotation input shaft, and a bottom wall portion of a casing of the rotation transmitting device of FIG. 1, FIGS. 3A and 3B are an explanatory view showing portions to be lubricated where a magnetic circuit is formed in the rotation transmitting device of FIG. 1, and an explanatory view showing point contact portions in a ball bearing, respectively.
Figure 2A:
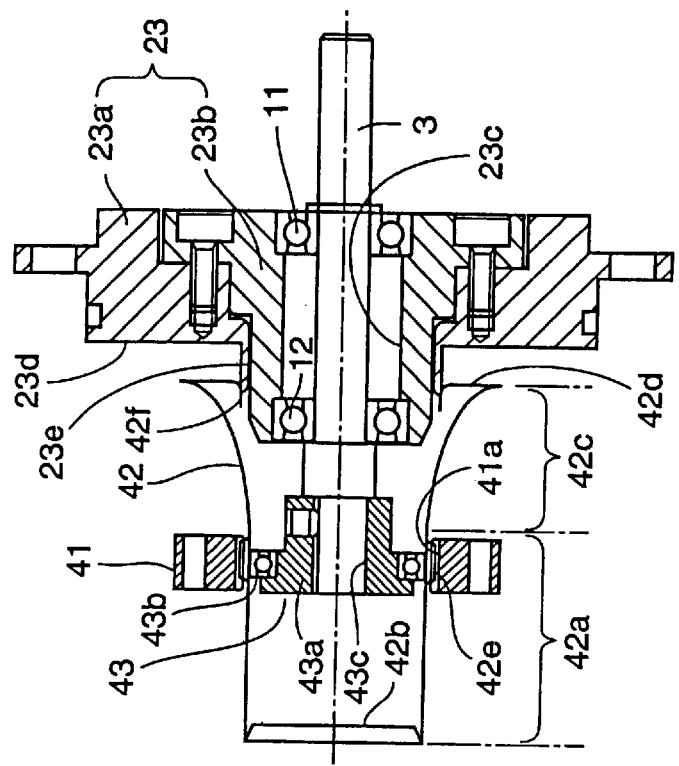
Figure 2B:
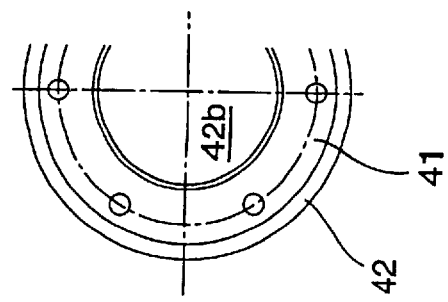

FIGS. 2A, 2B and 2C show the flexible meshing type gear drive 4, the rotation input shaft 3 and the bottom wall 23 taken out from the casing 2 in which these portions are disposed. Referring to FIG. 1 and FIGS. 2A to 2C, the flexible meshing type gear drive 4 disposed inside the casing 2 has the rigid internal gear 41, a flexible external gear 42 disposed inside the rigid internal gear, and a wave generator 43 fixed into the flexible external gear. The rigid internal gear 41 is of a circular shape and is formed on its inner circumferential surface with internal teeth 41a.

The flexible external gear 42 is disposed coaxially inside the rigid internal gear and has an annular body 42a, circular plate like end wall portion 42b closing one end of the annular body 42a, a bell-like portion 42c which is continued to the other end of the annular body 42a and extends bell-likely toward the side of the bottom wall 23, and a circular end plate portion 42d attached on an open end rim of the bell-like portion 42c, wherein the annular body 42a is formed on its outer circumferential surface with external teeth 42e. The external teeth 42e are meshable with the internal teeth 41a and has the number of teeth thereof 2n (n: positive integer) less than that of the internal teeth 41a.

In this example, the annular body 42a and the bell-like portion 42c are formed as a single member, while the circular plate like end wall portion 42b is connected air-tightly to the open end rim of the body 42a by welding or other means, and the circular end plate portion 42d is also connected air-tightly to the open end rim of the bell-like portion 42c by welding or other means. Also in this example, the number of teeth of the external gear is two less than that of the internal teeth.

The wave generator 43 is fixed into the flexible external gear 42 where the external teeth 42e are formed. The wave generator 43 of this example has an elliptical rigid cam plate 43a, and a ball bearing 43b fixed between the outer circumferential surface of the rigid cam plate 43a and the inner circumferential surface of the body 42a of the flexible external gear. The rigid cam plate 43a is formed on its center with a connecting axial hole 43c into which an end of the rotation input shaft 3 can be inserted.

The rotation input shaft 3 extends from the wave generator 43, passes through the bottom wall 23 of the casing 2 and projects into the first space 100. The bottom wall 23 has a circular flange 23a fixedly mounted on the body 21 of the casing 2 and a cylindrical holder 23b fixed coaxially inside the flange 23a. The holder 23b is formed at its center with an axial hole 23c for the rotation input shaft 3 to pass through, and the rotation input shaft 3 extending to pass therethrough is rotatably supported on the side of the holder 23b via a pair of ball bearings 11 and 12. The flange 23a has a circular end surface 23d at its inner side where a thin cylindrical portion 23e is formed which extends from an inner peripheral edge of the end surface in a direction of the axial line 1a. The cylindrical portion 23e is air-tightly connected at an outer peripheral edge of its end with a bent portion 42f which is formed on an inner peripheral edge of the circular plate-like end portion 42d of the flexible external gear 42 as constituted above.

With reference again to FIG. 1, the constitution at the side of the rotation output shaft 5 connected to the rigid internal gear 41 will be explained. The rotation output shaft 5 has a shaft portion 51 located inside the casing 2, and at the center of an end portion of this shaft portion 51 is formed a circular blind hole 53 for the flexible external gear to be inserted. The annular body 42a of the flexible external gear 42 is inserted into the blind hole 53 except for the portion thereof where the external teeth are formed. The rigid internal gear 41 is fixedly connected to a circular end surface of the shaft portion encircling the blind hole 53 by means of fastening bolts 55. Thus, the internal teeth 41a of the rigid internal gear 41 and the external teeth 42e of the flexible external gear 42 face with each other in a meshable condition, and the elliptical wave generator 43 is fixed inside the flexible external gear where the external teeth 42e are formed.

First and second ball bearings 13 and 14 are arranged at a constant interval along the direction of the axial line 1a at the outer circumference of the shaft portion 51 of the rotation output shaft 5, by means of which the rotation output shaft 5 is rotatably supported on the inner circumferential surface of the casing 2. A first annular spacer 15 is held between outer races 13a and 14a of the first and second ball bearings 13 and 14, and a third annular spacer 16 is also held between an outer race 14a of the second bearing 14 and the bottom wall 23 of the casing. Further, the outer race 13a of the first ball bearing 13 abuts on a circular step surface 2a formed on the inner circumferential surface of the casing 2. Therefore, with the first and third spacers 15 and 16, and with the circular step surface 2a, axial positions of the outer races 13a and 14a of the first and second ball bearings 13 and 14 are defined.

On the other hand, a second annular spacer 17 is held between inner races 13b and 14b of the ball bearings 13 and 14, the inner race 14b of the second ball bearing abuts on a circular step surface 51a formed on an end of the shaft portion 51 of the rotation output shaft 5, and the inner race 13b of the first ball bearing abuts on a nut 18 fixed on the outer circumference of the shaft portion 51 of the rotation output shaft 5. Thus, with the second spacer 17 and the circular step surface 51a, and with the nut 18, axial positions of the inner races 13b and 14b of the first and second ball bearings 13 and 14 are defined.

As mentioned above, in this example, the bearing mechanism for the rotation output shaft 5 is constituted to include the first and second ball bearings 13 and 14, and the first and second spacers 15 and 17.

In the rotation transmitting device 1 as constituted above, the casing 2 mounted on the partition wall 30, the flange 22 mounted on the casing 2 and the flexible external gear 42 mounted on the flange 23 cooperate to partition the space 100 at the side of the rotation input shaft 3 and the space 200 at the side of the rotation output shaft 5 in a perfectly airtight condition.

When the rotation input shaft 3 is driven by a motor or the like to rotate at a high speed, an output of rotation whose speed is reduced by the flexible meshing type gear drive 4 is introduced into the side of the rotation output shaft 5 via the rigid internal gear 41. The reduction mechanism of the flexible meshing type gear drive is well known, explanation thereof is omitted here in this specification. (Lubricating mechanism) Next, a lubricating mechanism for the rotation transmitting device 1 of this example as constituted above will be explained. A magnetic fluid is filled in the casing 2 of the rotation transmitting device 1 to lubricate portions to be lubricated. The portions to be lubricated at the side of the rotation output shaft 5 (the space 200) include portions of the first and second ball bearings 13 and 14, and the meshing portions between the internal teeth 41a of the rigid internal gear 41 and the external teeth 42e of the flexible external gear 42, whereas, at the side of the rotation input shaft 3 (the space 100), portions of the ball bearings 11 and 12 and of the ball bearings 43b of the wave generator 43 are included as the portions to be lubricated.

Here in this example, in order to carry out an appropriate lubrication of the vacuum side portions to be lubricated for a long period of time wherein the portions to be lubricated are the first and second bearings 13 and 13, and the meshing portions of the rigid internal gear 41 and the flexible external gear 42, a magnetic circuit is constituted to retain the magnetic fluid on these portions.

For the purpose of constituting the magnetic circuit, the first spacer 15 is made of a ferromagnetic material such as ferritic or martensitic stainless steel. Further, as shown in FIG. 1, it is magnetized to have N and S magnetic poles at its ends along the axial line direction 1a. Furthermore, at least the shaft portion 51 of the rotation output shaft 5 is made of a magnetic material. In addition, the ball bearings 13 and 14 are generally used metallic ones, and therefore magnetic. Whereas, the second spacer 17 is made to be nonmagnetic.

Figure 3A:
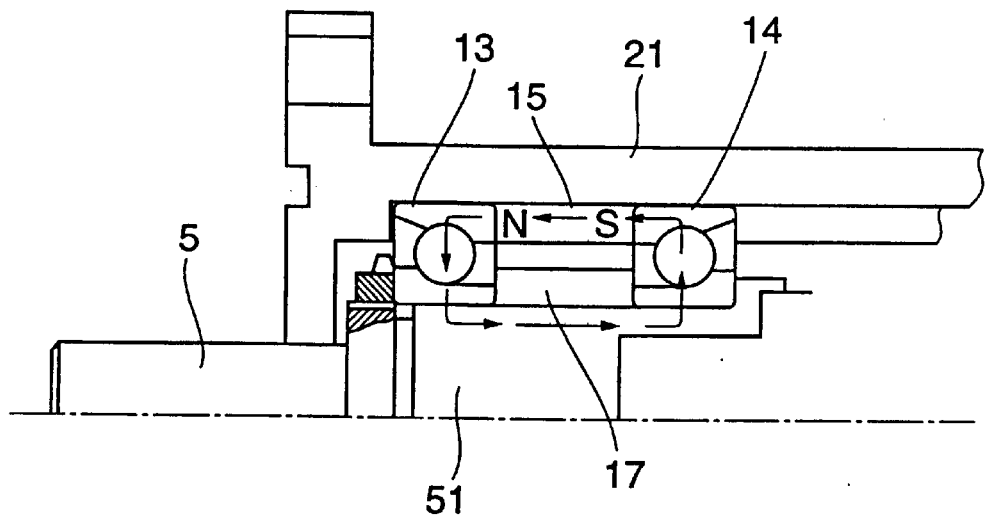
Figure 3B:
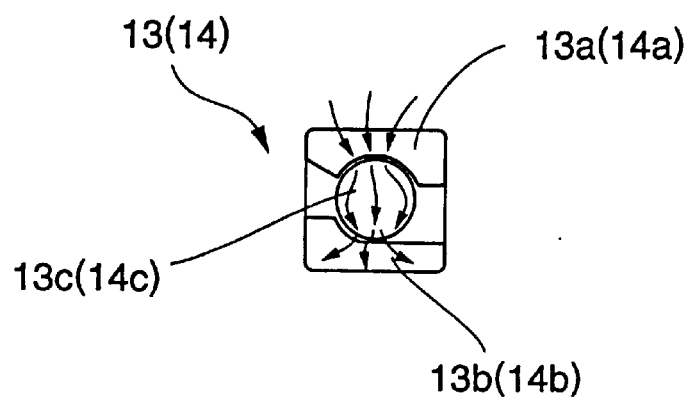

Therefore, in this example, as shown in FIG. 3A, the magnetic circuit is formed wherein magnetic flux flows along the direction indicated by an arrow. Namely, the magnetic circuit is formed which starts from the first spacer 15 or permanent magnet, passes through the ball bearing 13, the shaft portion of the rotation output shaft 5 and the ball bearing 14, and returns to the first spacer 15. As a result, as shown in FIG. 3B, the magnetic flux density becomes high in the region where the balls 13c, 14c of the ball bearings 13, 14 are in point contact with the surfaces of the outer and inner races 13a, 14a and 13b, 14b, whereby the condition is formed wherein the magnetic fluid is captured adjacent to the point contact portions.

In the rotation transmitting device 1 of this example, the magnetic fluid as lubricant is held on the contact portions of the ball bearings 13 and 14 which are the portions to be lubricated at the vacuum side by means of magnetic force. Therefore, the lubricant is not expelled from these portions even by the rolling motion of the ball bearings, so that such a condition is formed wherein sufficient lubricant is always being supplied to the contact portions. Hence, it is possible to realize prolongation of life of the ball bearings and that of the rotation transmitting device 1.

Further, the contact portions of the ball bearings 13, 14 are enclosed by the magnetic fluid, so that fine particles generated from the contact portions are captured by the magnetic fluid and prevented from leaking. Whereby, dust particles are prevented from leaking out to the vacuum side space 200 from the side of the rotation transmitting device 1.

On the other hand, the lubricating mechanism for the meshing portions between the rigid internal gear 41 and the flexible external gear 42 can be formed in the same manner. Namely, one of the rigid internal gear 41, the flexible external gear 42 and the outer race 43e of the ball bearing 43 of the wave generator 43 is magnetized along the axial line direction 1a. With this, the magnetic fluid is magnetically attracted to and retained on the meshing portions of the gears. As a result, it is possible to supply a sufficient amount of lubricant to the meshing portions, and to capture fine dust particles generated from the meshing portions by the magnetic fluid to prevent them from leak out to the vacuum side space 200.

(Another example of the magnetic circuit)

The magnetic circuit for the ball bearings 13, 14 as mentioned above may be constituted as follows.

Although the shaft portion 51 of the rotation output shaft 5 is made of magnetic material and the second spacer 17 of nonmagnetic material in the above example, in reverse to this, the shaft portion 51 may be made of nonmagnetic material and the second spacer 17 of magnetic material.

Figure 4:
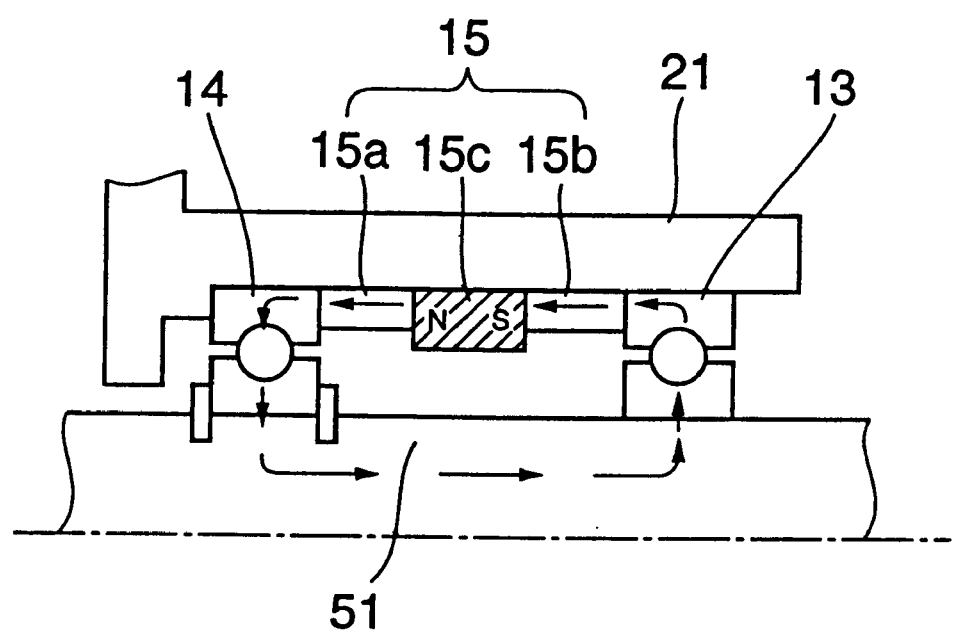
FIG. 4 is an explanatory view showing another example of the magnetic circuit shown in FIGS. 3A and 3B.

Further, as shown in FIG. 4, instead of magnetizing the first spacer 15 directly, the first spacer 15 may be constituted to have three members of the first and second spacer pieces 15a and 15b and a permanent magnet 15c held between these spacer pieces.

(Another examples)

In the above rotation transmitting device 1, a solid lubricant film can be formed on the surfaces of the portions to be lubricated in the bearing mechanism. For example, when a solid lubricant film such as PTFE film is formed on the surfaces of the balls and races of the first and second ball bearings, and other surfaces, lubricating properties can be enhanced further, and dust generation from these portions can also be suppressed.

Likewise, the same effects can be obtained when a coated solid lubricant is formed on the tooth surfaces of the rigid internal gear and flexible external gear.

As explained above, the rotation transmitting device 1 having the flexible meshing type gear drive according to this invention is constituted so that it utilizes a magnetic fluid as lubricant and that it has the magnetic circuit for generating magnetic force to retain the magnetic fluid on the portions to be lubricated. Therefore, the lubricant is not expelled from the portions to be lubricated even by the rolling contact motion or other motion of these portions, whereby it is always possible to sufficiently lubricate these potions. Accordingly, it is possible to realize prolongation of life of the portions to be lubricated, and that of the rotation transmitting device.

In addition, since the magnetic fluid is retained on the portions to be lubricated by magnetic force, there is formed a condition wherein the portions to be lubricated are enclosed by the magnetic fluid. As a result, fine wear particles and other dust which are generated from the portions to be lubricated are captured in the magnetic fluid and are prevented from discharging outside.

What is claimed is:

1. A rotation transmitting device which has a rotation input shaft disposed in a first space, a rotation output shaft disposed in a second space, a flexible meshing gear drive for transmitting a rotational motion introduced via the rotation input shaft into a side of the rotation output shaft, wherein the flexible meshing gear drive has a circular rigid internal gear, a flexible external gear and a wave generator for flexing the flexible external gear radially to mesh it partially with the rigid internal gear and for shifting meshing portions circumferentially, and wherein the wave generator is connected with the rotation input shaft, the rigid internal gear is connected with the rotation output shaft, and the flexible external gear is used as a partition wall for air-tightly partitioning the first and second spaces: comprising a bearing mechanism for rotatably supporting the rotation output shaft, a magnetic fluid as lubricant for lubricating portions to be lubricated in the bearing mechanism, and a magnetic circuit for generating a magnetic force to retain the magnetic fluid on the portions to be lubricated;

wherein the bearing mechanism has first and second roller bearings for rotatable supporting the rotation output shaft, and a first spacer which is inserted between outer races of the first and second roller bearings to maintain the gap between the roller bearings to be constant, the first spacer has a magnet member magnetized along an axial line direction of the rotation transmitting device, a first spacer piece inserted between the magnet member and the outer race of the first roller bearing, and a second spacer piece inserted between the magnet member and the outer race of the second roller bearing, the first and second roller bearings, and at least a portion of the rotation output shaft supported by the first and second roller bearings are made of a magnetic material, and the magnetic circuit is formed along a route starting from the first spacer piece, passing through the rotation output shaft and the second roller bearing, and returning to the first spacer piece.

2. The rotation transmitting device according to claim 1, wherein the first spacer is a single member formed integrally with the magnet member, and the first and second spacer pieces.

3. The rotation transmitting device according to claim 1 or 2, further comprising a second spacer inserted between inner races of the first and second roller bearings, wherein the second spacer is made of a magnetic material, while the rotation output shaft is made of a nonmagnetic material, and the magnetic circuit is formed along a route staring from the first spacer, passing through the first roller bearing, the second spacer and the second roller bearing, and returning to the first spacer.

4. The rotation transmitting device according to claim 1, wherein surfaces of the portions to be lubricated in the bearing mechanism are formed with a solid lubricant film.

5. The rotation transmitting device according to claim 1, further comprising a magnetic fluid as lubricant for lubricating the meshing portions between the rigid internal gear and the flexible external gear, and a second magnetic circuit for generating a magnetic force to retain the magnetic fluid on the meshing portions.

6. The rotation transmitting device according to claim 5, wherein the wave generator has a roller bearing fixed inside the flexible external gear, at least one member of the rigid internal gear, the flexible external gear and an outer race of the roller bearing of the wave generator is magnetized along the axial line direction of the rotation transmitting device, and the second magnetic circuit is formed by the magnetized member.

7. A rotation transmitting device which has a rotation input shaft disposed in a first space, a rotation output shaft disposed in a second space, a flexible meshing gear drive for transmitting a rotational motion introduced via the rotation input shaft into a side of the rotation output shaft, wherein the flexible meshing gear drive has a circular rigid internal gear, a flexible external gear and a wave generator for flexing the flexible external gear radially to mesh it partially with the rigid internal gear and for shifting meshing portions circumferentially, and wherein the wave generator is connected with the rotation input shaft, the rigid internal gear is connected with the rotation output shaft, and the flexible external gear is used as a partition wall for airtightly partitioning the first and second spaces: comprising a magnetic fluid as lubricant for lubricating the meshing portions between the rigid internal gear and the flexible external gear, and a magnetic circuit for generating a magnetic force to retain the magnetic fluid on the meshing portions.

8. The rotation transmitting device according to claim 7, wherein the wave generator has a roller bearing fixed inside the flexible external gear, at least one member of the rigid internal gear, the flexible external gear and an outer race of the roller bearing of the wave generator is magnetized along the axial line direction of the rotation transmitting device, and the magnetic circuit is formed by the magnetized member.

9. The rotation transmitting device according to claim 7 or 8, wherein a solid lubricant film is formed on surfaces of the internal teeth of the rigid internal gear and of the external teeth of the flexible external gear.

* * * * *